United States Patent [19]

Seet

[11] Patent Number: 4,820,036

[45] Date of Patent: Apr. 11, 1989

[54] HEADBAND FOR RETENTION OF GLASSES

[76] Inventor: Wilson Seet, 116 Lobo Vista, Novato, Calif. 94947

[21] Appl. No.: 49,138

[22] Filed: May 11, 1987

[51] Int. Cl.$^4$ ............................ G02C 3/02; G02C 1/00
[52] U.S. Cl. ..................................... 351/156; 351/157; 351/43
[58] Field of Search ........................ 351/43, 156, 157; 2/452

[56] References Cited

U.S. PATENT DOCUMENTS 4,692,002  9/1987  Meistreu .............................. 351/156

FOREIGN PATENT DOCUMENTS 2296196  7/1976  France .................................. 351/43
2328978  6/1977  France .................................. 351/43

Primary Examiner—Rodney B. Bovernick
Attorney, Agent, or Firm—Thomas M. Freiburger

[57] ABSTRACT

A headband for retaining glasses on the head of a user is formed of a closed cell foam material which is highly buoyant in water. The band has a series of nipples or studs formed into its surface which contacts the back of the head, and these both engage the hair to keep the band from slipping and also tend to hold the body of the band slightly away from the head, for increased air circulation and comfort of the user. The band or strap preferably is of a bright luminescent color so that, if the glasses and attached strap are dropped in water (as in boating), they can be easily found and retrieved.

19 Claims, 1 Drawing Sheet

HEADBAND FOR RETENTION OF GLASSES

BACKGROUND OF THE INVENTION

The invention relates to sports accessories, and in particular it relates to a headband or strap attachable to the temples of glasses (sunglasses or optical glasses), to retain the glasses on the head of the user during sporting activities.

Straps or cords for retaining glasses on the person of a user have been known in various forms. In one retaining device a simple cord, usually black, had rubber or other high-friction grips at its ends, for gripping the temples of a pair of glasses. The cord was simply draped around the neck, so that the user could remove his glasses and let them hang around the neck, and if the glasses fell off, they would be likely to be retained around the neck.

Another type of device, more closely related to the present invention, is shown in U.S. Pat. No. 4,133,604. This device was a neoprene glasses-retention strap in the form of a headband, the ends of which attached to the temples of the glasses. This strap was placed around the back of the head, with slight tension, so that the glasses were supposed to be always retained in position on the eyes during sporting activities. This type of glasses retainer was always in dark colors, usually black or dark gray.

There has not been a previous glasses-retaining strap or band which has served to comfortably and securely retain glasses in place, while also having a very high buoyancy characteristic for flotation above the surface of water, as in the present invention described below.

SUMMARY OF THE INVENTION

The present invention is an improved glasses retaining device in the form of a headband or strap which attaches to the temples of optical glasses or sunglasses via its ends and extends comfortably around the back of the wearer's head. The band is formed of a relatively high density closed-cell foam material, preferably either irradiated cross-lined polyethylene or ethyl vinyl acetate (EVA). These materials have an extremely high buoyancy, and if the glasses and attached headband are dropped in water, as in water sports or boating activities, the headband will actually float substantially entirely on the surface of the water, making it readily seen and retrievable.

In preferred embodiments of the invention, the headband or strap is formed in very bright, preferably fluorescent colors, not only giving it an attractive appearance but also greatly aiding in the ability to sight it on water.

At the ends of the headband glasses retainer of the invention are a pair of slits or narrow openings, through which the temples of the glasses are tightly inserted. The nature of the foam material of the headband is that it has a high friction as against the hard plastic of glasses temples, so that it grips the temples without slippage. When the band is slightly tensioned around the back of the wearer's head, the ends of the band must bend, putting a bending or biasing force at the point where the temples are gripped by the band, further aiding in high-friction gripping of the temples.

Still further aiding in the gripping of the glasses temples by the band is a special characteristic of the cross-linked polyethylene material. When this material becomes wetted, which can occur from perspiration of the wearer, the material expands or swells slightly. This has the effect of tightening the slits or holes which receive the glasses temples, causing the temples to be gripped even more tightly.

Another important feature of the glasses retention strap of the invention is a plurality of nipples or studs or bosses formed in the surface of the strap which engages the back of the wearer's head. These nipples, which may have a depth of about $\frac{1}{4}$ inch, tend to engage in the wearer's hair to prevent slippage either up/down or side/side. Another important benefit of the nipples is that they provide limited points of engagement of the headband with the back of the head, so that some air flow is provided between the band and the head, helping the user to feel cool and comfortable while wearing the headband.

It is therefore among the objects of the invention to improve over previous glasses retention straps or bands in a number of respects, including reliable retention of the glasses, comfort of the wearer, attractive appearance and flotation and findability of the headband and glasses in water. These and other objects, advantages and features of the invention will be apparent from the following description of a preferred embodiment, considered along with the accompanying drawings.

DESCRIPTION OF THE PREFERRED EMBODIMENT

Figure 1:
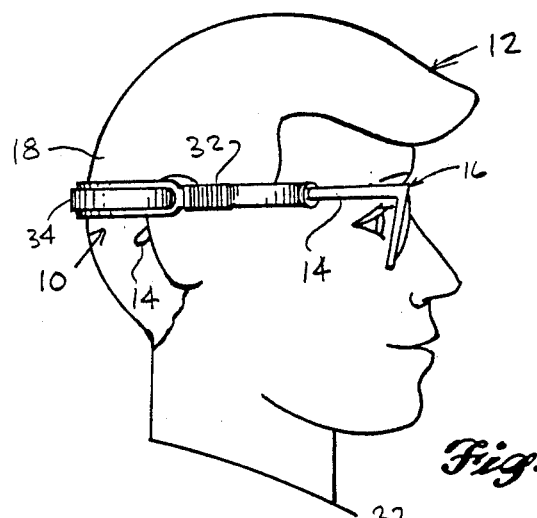
FIG. 1 is a side elevation view of the glasses retention band of the invention, as worn on the head of a user to retain glasses in place over the eyes.
Figure 2:
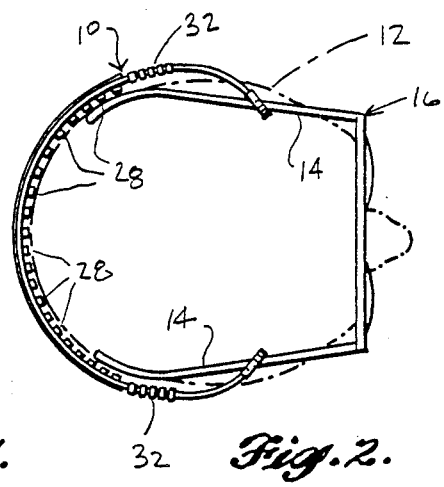
FIG. 2 is plan view of the strap of the invention as worn by the user, with the user's head shown in dashed lines.

In the drawings, FIG. 1 shows a headband glasses retainer generally identified as 10, as worn on a wearer's head 12. The glasses-retaining device 10 is connected to the temples 14 of the wearer's glasses 16, extending around the back of the head and against the hair 18. FIG. 2 shows this arrangement in plan view.

The glasses retainer device 10 may be formed by compression molding of foam material, in one integral piece.

Figure 4:
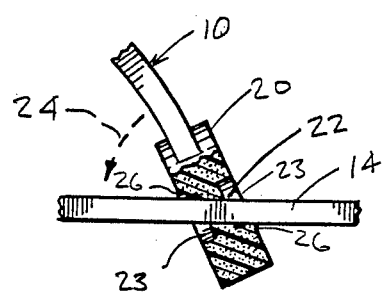
FIG. 4 is a still further detailed partial view, partially broken away and in section, illustrating the retention of the glasses temple by an end member of the headband having a small opening.

As indicated in all of the drawing figures, the temple 14 of the glasses passes through an end member or connector 20 of the headband or strap 10. Specifically, the temple 14 passes through a narrow slit or opening 22 in the end member 20, which is the same on both ends of the headband 10. As illustrated in FIG. 4, the slit or narrow opening 22 may be surrounded by an enlarged recessed area 23 on both faces of the end member 20, with the slit 22 itself formed through a narrowed and somewhat more pliable portion of material.

As can be seen from the figures, when the end members 20 are pushed over the temples and moved along the temples generally as shown in the drawings, to the point that a proper fit for the wearer's head 12 is achieved, the end members are then forced into a flexed, tilted position with respect to the temples 14 of the glasses. This is indicated by the dashed-line arrow 24 in FIG. 4. The portion of the headband or strap 10 adjacent to the temple tends to be pulled toward a configuration approximately parallel to the temple, due to the slight tension in the headband or strap 10. This causes the end member or connector 20, at each end of the headband, to tilt under a biasing force as shown in the drawings, particularly FIG. 4, with the result that the temple 14 is engaged even more tightly, not only by the slit 22 itself, but also by edges 26 of the material on either side of the slit, at the mouths of the recesses 23. Thus, the temples 14 are gripped very tightly and with high-friction contact by the end members 20 of the headband 10, so that slippage down the temple is very unlikely to occur.

The preferred materials from which the headband or strap 10 of the invention is formed, particularly the preferred material irradiated crosslinked polyethylene in a closed-cell foam, has the characteristic that when wetted, it will swell slightly. When this occurs at the end members or connectors 20, the swelling tends to make the temple-engaging slit or orifice 22 slightly tighter, and the result is that the temples are gripped even more securely and tightly against slippage.

Figure 3:
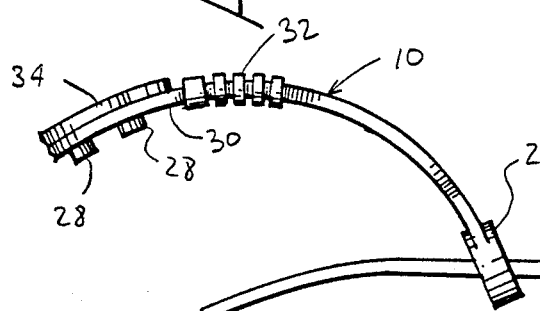
FIG. 3 is a partial plan view, showing a portion of what is shown in FIG. 2 and illustrating the connection of the headband to the glasses.
Figure 5:
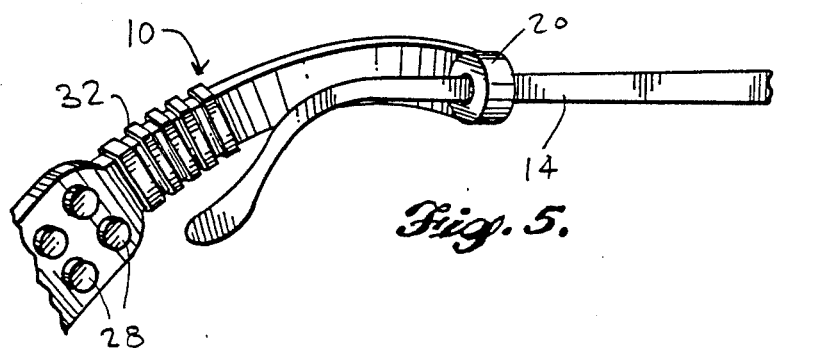
FIG. 5 is a perspective view showing a portion of the headband and of one temple of the glasses and further illustrating the relationship of the headband to the glasses in the position of use.

As shown in the drawings, particularly FIGS. 2, 3 and 5, the headband 10 of the invention preferably includes a large plurality of nipples or bosses 28, integrally formed on the interior side of the strap where it will engage the back of the head, particularly as shown in FIG. 2. As mentioned above, these studs or nipples may be about ¼ inch in depth, i.e. protruding ¼ inch from the surface 30 of the strap. In any event, the nipples have a depth preferably in the range of 1/6 inch to ⅜ inch. They may be at a spacing of about ¼ inch edge-to-edge, and with a diameter of about ¼ inch. The nipples have the advantage of tending to "seat" or engage in the hair of the user, preventing slipping movement in either the up/down or side-to-side directions. A further important effect of these nipples or studs 28 is to hold the headband surface 30 somewhat away from the head, as can be seen in FIG. 2, thereby allowing a passage of air between the headband and the head, reducing head and perspiration buildup and discomfort in that area.

As shown in the drawing figures there may be in the range of about 12 to 24 pairs of these nipples 28, arranged in rows as illustrated.

The headband or strap 10 may also include a pair of "hinges" or bending portions 32, one near either end of the band as indicated in the drawing figures. These are formed by alternating, stepped thick and thin portions of material, as illustrated, and may be positioned adjacent to where the nippled area ends at both sides of the wearer's head.

As illustrated in FIGS. 1, 2 and 3, there may also be included an elongated boss area 34 on the strap 10, at the outside of the strap opposite the location of the nipples 28. This gives added strength to this portion of the strap, and, as discussed below, adds further volume for buoyancy in water.

As mentioned above, the preferred materials from which the headband glasses retainer 10 is integrally formed are highly buoyant, and will tend to float almost entirely on the surface of water, even when carrying the weight of a pair of glasses. In accordance with the preferred embodiment of the invention, the headband or strap 10 is of a very bright, fluorescent color such as bright orange or yellow or blue or green, which further enhances the ability to spot and retrieve the headband and glasses from water. The highly buoyant material acts in conjunction with the bright color to immediately show the location of the glasses and headband, even at appreciable distance.

The above-described preferred embodiment is intended to illustrate the principles of the invention, but not to limit the scope of the invention. Other embodiments and variations to this preferred embodiment will be apparent to those skilled in the art and may be made without departing from the scope of the invention as defined in the following claims.

I claim:

1. A headband for retention of glasses on a wearer's head, comprising, an integrally formed, one-piece strap of flexible material, the strap of material having end members at its two ends, each end member having an opening for tightly receiving a temple of a pair of glasses, inserted through the opening, and the strap having a multiplicity of nipples on an inside surface positioned to engage the back of the wearer's head, whereby the nipples tend to engage in the hair of the wearer to prevent slipping movement of the headband and whereby the nipples tend to space the headband away from the head sufficiently to allow some air circulation between the headband and the wearer's head for comfort of the wearer.

2. The headband of claim 1, wherein said flexible material comprises one of the two materials (1) irradiated crosslinked polyethylene and (2) ethyl vinyl acetate, in a closed-cell foam having a high buoyancy characteristic in water.

3. The headband of claim 2, wherein the closed-cell foam material has a density between about two pounds per cubic foot and six pounds per cubic foot, and a tensile strength between about 45 psi and 200 psi.

4. The headband of claim 1, wherein the flexible material comprises a highly buoyant closed-cell foam material, to the extent that the material floats almost entirely on the surface of water.

5. The headband of claim 4, wherein the one-piece strap is of a very bright color, easily seen at considerable distance.

6. The headband of claim 5 wherein the color is a fluorescent color.

7. The headband of claim 1, wherein the openings for temples in the end members each comprise a slit oriented generally vertically with respect to the position of use when the headband is worn, so that the slit is oriented generally in alignment with the cross-sectional shape of the temple of the glasses.

8. The headband of claim 7, further including in each end member a recess on each face of the end member, around the slit, so that the material around the slit is thinner than the thickness of the remainder of the end member.

9. The headband of claim 7, wherein the flexible material is a closed-celled foam having a characteristic of swelling slightly when wetted, whereby the slits receiving the temples of the glasses tend to engage the temples more tightly when the headband is wetted.

10. The headband of claim 1, wherein the one-piece strap is of a bright color which is easily seen from considerable distance.

11. The headband of claim 10, wherein the bright color is a fluorescent color.

12. The headband of claim 1, wherein the nipples protrude from a surface of the strap by about ¼ inch.

13. The headband of claim 12, wherein the nipples are generally circular with a diameter of about ¼ inch, and wherein adjacent nipples are spaced apart about ¼ inch edge-to-edge centers.

14. A headband for retention of glasses on a wearer's head, comprising,
- an integrally formed, one-piece strap of flexible, highly buoyant closed-cell foam material, the strap being of such weight and buoyancy as to render the strap capable of floating almost entirely on the surface of water while attached to a pair of eyeglasses,
- the strap of material having end members at its two ends, each end member having an opening for tightly receiving a temple of a pair of glasses, inserted through the opening, and
- the openings for temples in the end members each comprising a single slit passing through the end member generally perpendicularly to the length of the headband and oriented generally vertically with respect to the position of use when the headband is worn, so that the slip is oriented generally in alignment with the cross-sectional shape of the temple of the glasses, and so that in a position of use, with a slight tension in the headband, a biasing force tends to flex and tilt the end members with respect to the temples of the glasses, causing the slits to engage the temples more firmly,
- wherein the strap is easily sighted for retrieval of the eyeglasses and strap in water.

15. The headband of claim 14, wherein said flexible material comprises one of the two materials (1) irradiated crosslinked polyethylene and (2) ethyl vinyl acetate, and wherein the headband is formed by compression molding.

16. The headband of claim 14, further including in each end member a recess on each face of the end member, around the slit, so that the material around the slit is thinner than the thickness of the remainder of the end member.

17. The headband of claim 14 wherein the flexible closed-celled foam material has a characteristic of swelling slightly when wetted, whereby the slits receiving the temples of the glasses tend to engage the temples more tightly when the headband is wetted.

18. The headband of claim 14, wherein the strap is of a very bright color, easily seen at a considerable distance, further adding to its visibility on water.

19. A headband for retention of glasses on a wearer's head, comprising,
- an integrally formed, one-piece strap of flexible, highly buoyant closed-cell foam material,
- the strap of material having end members at its two ends, each end member having an opening for tightly receiving a temple of pair of glasses, inserted through the opening, the openings in the end members each comprising a slit oriented generally vertically with respect to the position of use when the headband is worn, so that the slit is oriented generally in alignment with the cross-sectional shape of the temple of the glasses,
- the strap further including a multiplicity of nipples on an inside surface positioned to engage the back of the wearer's head, whereby the nipples tend to engage in the hair of the wearer to prevent slipping movement of the headband and whereby the nipples tend to space the headband away from the head sufficiently to allow some air circulation between the headband and the wearer's head for comfort of the wearer, and
- the strap being of a very bright color, easily seen at a considerable distance,
- whereby the strap will float almost entirely on the surface of water and is easily sighted for retrieval of the glasses and strap in water.

* * * * *